(12) United States Patent
Zhang

(10) Patent No.: US 11,150,514 B2
(45) Date of Patent: Oct. 19, 2021

(54) REFLECTIVE SHEET AND MANUFACTURING METHOD THEREFOR, AND DIRECT-LIT BACK LIGHT MODULE AND DISPLAY DEVICE

(71) Applicants: HEFEI BOE VISION-ELECTRONIC TECHNOLOGY CO., LTD., Anhui (CN); BOE TECHNOLOGY GROUP CO., LTD., Beijing (CN)

(72) Inventor: Yu Zhang, Beijing (CN)

(73) Assignees: HEFEI BOE VISION-ELECTRONIC TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 16/623,516

(22) PCT Filed: Apr. 28, 2019

(86) PCT No.: PCT/CN2019/084784
§ 371 (c)(1),
(2) Date: Dec. 17, 2019

(87) PCT Pub. No.: WO2019/206329
PCT Pub. Date: Oct. 31, 2019

(65) Prior Publication Data
US 2021/0149253 A1  May 20, 2021

(30) Foreign Application Priority Data

Apr. 28, 2018 (CN) .......................... 201810401649.2

(51) Int. Cl.
*G02F 1/13357* (2006.01)
*G02F 1/1335* (2006.01)

(52) U.S. Cl.
CPC .. *G02F 1/133611* (2013.01); *G02F 1/133605* (2013.01); *G02F 1/133606* (2013.01); *G02F 1/133614* (2021.01)

(58) Field of Classification Search
None
See application file for complete search history.

(56) References Cited

FOREIGN PATENT DOCUMENTS

| CN | 104483778 A |   | 4/2015 |
|----|-------------|---|--------|
| CN | 105065995 A |   | 11/2015 |
| CN | 106597741 A |   | 4/2017 |
| CN | 106647020 A | * | 5/2017 |
| CN | 106647020 A |   | 5/2017 |
| CN | 207049680 U |   | 2/2018 |
| CN | 108594528 A |   | 9/2018 |
| JP | 2018037172 A |   | 3/2018 |

\* cited by examiner

*Primary Examiner* — Britt D Hanley

(57) ABSTRACT

A reflective plate and a manufacturing method thereof, a direct-lit backlight module and a display apparatus are provided. The reflective plate includes: a reflection layer and a photoluminescent layer. The reflection layer includes a peripheral portion, and the peripheral portion includes an inner region and an edge region outside the inner region; and the photoluminescent layer is on the peripheral portion of the reflection layer, covers at least part of the edge region and is configured to emit light under light irradiation.

18 Claims, 6 Drawing Sheets

REFLECTIVE SHEET AND MANUFACTURING METHOD THEREFOR, AND DIRECT-LIT BACK LIGHT MODULE AND DISPLAY DEVICE

The present application claims priority of Chinese Patent Application No. 201810401649.2 filed on Apr. 28, 2018, the disclosure of which is incorporated herein by reference in its entirety as part of the present application.

TECHNICAL FIELD

Embodiments of the present disclosure relate to a technical field of semiconductor technology, and particularly a reflective plate and a manufacturing method thereof, a direct-lit backlight module, and a display apparatus.

BACKGROUND

A liquid crystal display is widely applied due to excellent quality, but because liquid crystals cannot emit light, a backlight module is required to provide light for image display. In order to have a better viewing effect from all angles, a liquid crystal display screen needs to meet the requirement for brightness uniformity, and thus, it is required that brightness of emergent light of the backlight module must be uniform.

The backlight module structurally can be divided into a direct-lit type and a side-lit type, and generally, a light source of a direct-lit backlight module is from a light sources (for example, a light bar comprising point light sources of Light-Emitting Diode (LED)) arranged in an array in a backplane. For example, light emitted by the light sources is reflected by a reflective plate and diffused and condensed by an optical film so as to obtain a surface light source with better image brightness uniformity. However, distribution of the light sources usually cannot give consideration to all regions of a light-emitting surface, for example, an edge region and particularly a corner region, and thus, it is easy to cause a problem of low brightness in those regions, that is, defect of dark corner. In a current trend that a light mixing distance is smaller and smaller, the liquid crystal display pursues thin and light design and the number of the light sources is decreased in order to reduce cost, the defect of dark corner of the backlight module becomes an increasingly serious problem.

In general, this problem can be reduced by a method of changing distribution of the light sources. For example, a conventional light bar substrate is bent to reduce a distance from a point light source on the light bar to a corner, so as to improve uniformity of brightness. However, such a technical solution is complex in process and requires use of a flexible light bar, which increases machining difficulty of the light bar and increases costs.

SUMMARY

At least one embodiment of the present disclosure provides a reflective plate, and the reflective plate comprises a reflection layer and a photoluminescent layer. The reflection layer comprises a peripheral portion; the peripheral portion comprises an inner region and an edge region outside the inner region; the photoluminescent layer is on the reflection layer and covers at least part of the edge region and being configured to emit light under light irradiation For example, in the reflective plate provided by an embodiment of the present disclosure, the reflection layer further comprises a central portion; and the peripheral portion surrounds the central portion and has an included angle with the central portion.

For example, in the reflective plate provided by an embodiment of the present disclosure, the reflection layer further comprises a central portion; and the peripheral portion surrounds the central portion and is in a same plane with the central portion.

For example, in the reflective plate provided by an embodiment of the present disclosure, a planar shape of the reflection layer has at least one corner region, at least part of the at least one corner region is in the edge region, and the photoluminescent layer covers the at least one corner region.

For example, in the reflective plate provided by an embodiment of the present disclosure, an orthographic projection of the reflection layer on a plane parallel to the central portion is in a shape of a polygon, the at least one corner region comprises a plurality of vertex angle regions of the polygon, and the photoluminescent layer covers at least one of the plurality of vertex angle regions.

For example, in the reflective plate provided by an embodiment of the present disclosure, the photoluminescent layer covers each of the plurality of vertex angle regions.

For example, in the reflective plate provided by an embodiment of the present disclosure, the photoluminescent layer covers an entirety of the edge region.

For example, in the reflective plate provided by an embodiment of the present disclosure, light intensity of the light emitted by the photoluminescent layer gradually increases along a direction from the inner region to the edge region.

For example, in the reflective plate provided by an embodiment of the present disclosure, the peripheral portion is in a closed loop shape.

For example, in the reflective plate provided by an embodiment of the present disclosure, an area of the photoluminescent layer occupies 5% to 10% of an area of the peripheral portion of the reflection layer.

For example, in the reflective plate provided by an embodiment of the present disclosure, a thickness of the photoluminescent layer is in a range of 10 micrometers to 20 micrometers.

For example, in the reflective plate provided by an embodiment of the present disclosure, a material of the photoluminescent layer is a fluorescent powder material, a semiconductor light-emitting material, an organic light-emitting material or a quantum dot light-emitting material.

For example, in the reflective plate provided by an embodiment of the present disclosure, the material of the photoluminescent layer is the fluorescent powder material, and the fluorescent powder material is calcium halophosphate fluorescent powder.

At least one embodiment of the present disclosure further provides a direct-lit backlight module, and the direct-lit backlight module comprises any one of the reflective plates provided by embodiments of the present disclosure, and a light source structure. The light source structure is on the reflective plate; the peripheral portion of the reflection layer surrounds the light source structure; and the photoluminescent layer is configured to receive at least part of light emitted by the light source structure, and the reflection layer is configured to reflect at least part of the light emitted by the light source structure.

For example, in the direct-lit backlight module provided by an embodiment of the present disclosure, the light source structure comprises a plurality of light-emitting devices arranged in an array, and each of the plurality of light-emitting devices comprises a driving chip and a lens surrounding the driving chip.

For example, the direct-lit backlight module provided by an embodiment of the present disclosure further comprises a diffusing plate and an optical film. The diffusing plate is on the light source structure and configured to diffuse light from the light source structure and light reflected by the reflection layer; and the optical film is on the diffusing plate.

At least one embodiment of the present disclosure further provides a display apparatus, and the display apparatus comprises the direct-lit backlight module any one of the direct-lit backlight module provided by embodiments of the present disclosure.

At least one embodiment of the present disclosure further provides a manufacturing method of a reflective plate, and the method comprises providing a substrate; forming a reflection layer on the substrate, in which the reflection layer comprises a peripheral portion, and the peripheral portion comprises an inner region and an edge region on one side of the inner region closing to an edge of the reflection layer; and forming a photoluminescent layer, in which the photoluminescent layer is on the reflection layer, covers at least part of the edge region and is configured to emit light under light irradiation.

For example, in the manufacturing method of the reflective plate provided by an embodiment of the present disclosure, a planar shape of the reflection layer has at least one corner region, and at least part of the at least one corner region is in the edge region; the manufacturing method of the reflective plate comprises forming the photoluminescent layer covering the at least one corner region.

For example, in the manufacturing method of the reflective plate provided by an embodiment of the present disclosure, the photoluminescent layer covers an entirety of the edge region.

For example, the manufacturing method of the reflective plate provided by an embodiment of the present disclosure comprises forming the photoluminescent layer by a method of spraying.

For example, the manufacturing method of the reflective plate provided by an embodiment of the present disclosure comprises providing photoluminescent material solutions of different concentrations; and spraying the photoluminescent material solutions to form the photoluminescent layer, in which the concentrations of the photoluminescent material solutions sprayed gradually increase along a direction from the inner region to the edge region, so that light intensity of the light emitted by the photoluminescent layer gradually increases along the direction from the inner region to the edge region.

The embodiment of the present disclosure has the following beneficial effects: he photoluminescent layer can emit the light when being irradiated by light and further, the photoluminescent layer 4 covers at least part of the edge region 312 so as to promote brightness of the reflective plate at the edge region 312, and thus, in a premise of not increasing the number of light sources of a backlight module comprising the reflective plate and not increasing a light mixing distance, brightness uniformity of light provided by the backlight module comprising the reflective plate can be improved, and brightness of the display panel adopting the backlight module at the edge region (comprising a corner position) can be improved so as to avoid a problem of non-uniform brightness of the display panel caused by poor brightness of the display panel at the corner position; moreover, compared with a general solution that a light bar for emitting light to the reflective plate needs to be bent so as to improve uniformity of brightness, the solution of embodiments of the present disclosure can simplify complexity of a process and reduce overall manufacturing cost and can be well popularized and applied; and in addition, by adopting the photoluminescent layer in the solution, when the backlight module adopting the reflective plate emits light, the photoluminescent layer emits light under light irradiation to adjust brightness of the edge region, and when the backlight module does not emit light, the photoluminescent layer stops emitting light, so that automatic adjustments can be realized, it is not required to design a circuit and a route separately for control, and a structure, a manufacturing process and an operation process of the backlight module adopting the reflective plate are simplified.

BRIEF DESCRIPTION OF THE DRAWINGS

In order to clearly illustrate the technical solution of the embodiments of the disclosure, the drawings of the embodiments will be briefly described in the following; and it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by those of ordinary skill in the art to which the present disclosure belongs. The terms "first," "second," etc., which are used in the description and the claims of the present disclosure, are not intended to indicate any sequence, amount or importance, but used to distinguish various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

In order to keep the illustration of the embodiments of the present disclosure clear and concise, the present disclosure omits detailed illustration of known functions and known components.

At least one embodiment of the present disclosure provides a reflective plate. The reflective plate comprises a reflection layer and a photoluminescent layer. The reflection layer comprises a peripheral portion, and the peripheral portion comprises an inner region and an edge region outside the inner region; and the photoluminescent layer is positioned on the peripheral portion of the reflection layer, covers at least part of the edge region and is configured to emit light under light irradiation.

Figure 1A:
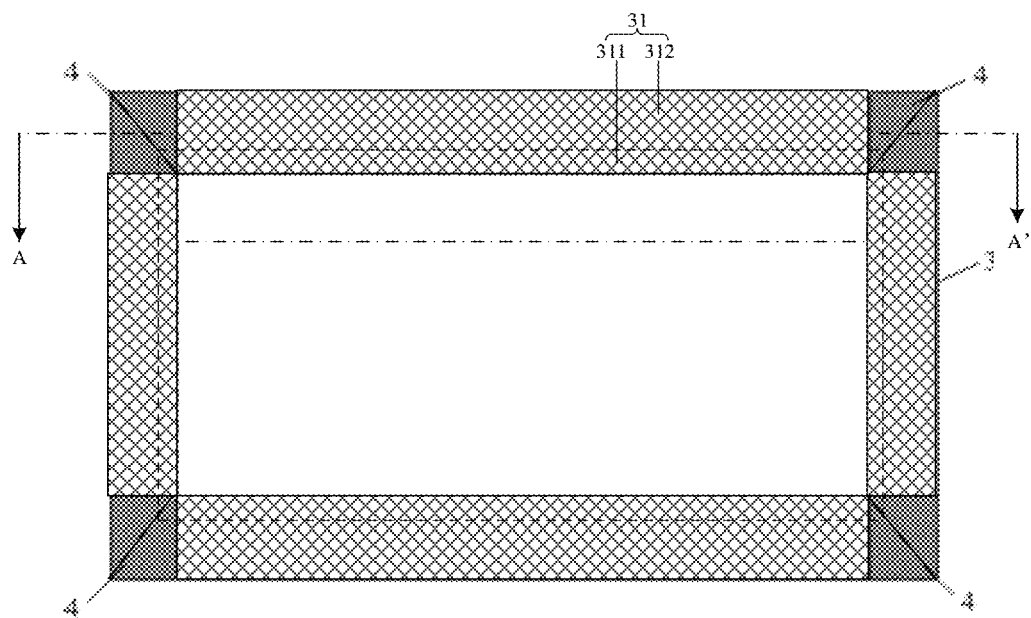
FIG. 1A is a plan schematic diagram of a reflective plate provided by one embodiment of the present disclosure.
Figure 1B:
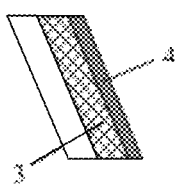
FIG. 1B is a sectional schematic diagram taken along a line A-A' in FIG. 1A.
Figure 1B:
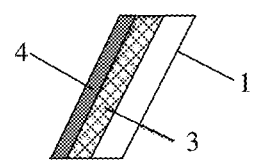

FIG. 1A is a plan schematic diagram of a reflective plate provided by one embodiment of the present disclosure, and FIG. 1B is a sectional schematic diagram along a line A-A' in FIG. 1A. In connection with FIG. 1A and FIG. 1B, one embodiment of the present disclosure provides a reflective plate. The reflective plate comprises: a substrate 1, a reflection layer 3 and a photoluminescent layer 4. The reflection layer 3 comprises a peripheral portion 31, and the peripheral portion 31 comprises an inner region 311 and an edge region 312 outside the inner region 311. It should be illustrated that those skilled in the art can design a boundary of the inner region 311 and the edge region 312 according to specific demands and for example, design the boundary according to a region where the reflective plate is arranged in and an area of the reflective plate. The photoluminescent layer 4 covers part of the edge region 312 and is configured to emit light under light irradiation. For example, the photoluminescent layer 4 covers part of the inner region 311, and a portion, which is not covered by the photoluminescent layer 4, of the inner region 311 is configured to reflect incident light. Generally, distribution of a light source cannot give consideration to all regions, such as an edge region, of a light-emitting surface of a display panel adopting a backlight source comprising the reflective plate, and thus, it is easy to cause a problem of low brightness in those regions, for example, defect of dark corner. The photoluminescent layer can emit the light when being irradiated by light and further, the photoluminescent layer 4 covers at least part of the edge region 312 so as to promote brightness of the reflective plate at the edge region 312, and thus, in a premise of not increasing the number of light sources of a backlight module comprising the reflective plate and not increasing a light mixing distance, brightness uniformity of light provided by the backlight module comprising the reflective plate can be improved, and brightness of the display panel adopting the backlight module at the edge region (comprising a corner position) can be improved so as to avoid a problem of non-uniform brightness of the display panel caused by poor brightness of the display panel at the corner position; moreover, compared with a general solution that a light bar for emitting light to the reflective plate needs to be bent so as to improve uniformity of brightness, the solution of embodiments of the present disclosure can simplify complexity of a process and reduce overall manufacturing cost and can be well popularized and applied; and in addition, by adopting the photoluminescent layer 4 in the solution, when the backlight module adopting the reflective plate emits light, the photoluminescent layer 4 emits light under light irradiation to adjust brightness of the edge region, and when the backlight module does not emit light, the photoluminescent layer 4 stops emitting light, so that automatic adjustments can be realized, it is not required to design a circuit and a route separately for control, and a structure, a manufacturing process and an operation process of the backlight module adopting the reflective plate are simplified.

For example, a planar shape of the reflection layer has a plurality of corner regions (for example, the corner regions are regions covered by the photoluminescent layer 4 in FIG. 1A), part of the corner regions is in the edge region, and the photoluminescent layer covers at least one of the plurality of corner regions. For example, a planar shape of the reflection layer is a polygon, the corner regions are a plurality of vertex angle regions of the polygon, and the photoluminescent layer covers the vertex angle regions. For example, in the embodiment as illustrated in FIG. 1A, the planar shape of the reflection layer 3 is a rectangle and the rectangle has four vertex angle regions. A part of the vertex angle regions is in the edge region 312, and the photoluminescent layer 4 covers the four vertex angle regions, that is, the photoluminescent layer covers each of the vertex angle regions. Of course, in other embodiments, the photoluminescent layer 4 also can cover one or two or three of the vertex angle regions. Generally, distribution of the light source cannot give consideration to the corner region, and thus, it is easy to cause the problem of low brightness in the corner regions, for example, defect of dark corner. In the current trend that the light mixing distance is smaller and smaller, a liquid crystal display pursues the thin and light design and the number of the light sources is decreased in order to reduce cost, one embodiment of the present disclosure can eliminate or reduce the problem of dark corner. In addition, a planar shape of the common display panel is a rectangle, and a corresponding direct-lit backlight module thereof is integrally in a shape of a rectangle. The photoluminescent layers 4 are arranged at all the four vertex angle regions, so that brightness of each corner of the display panel can be improved, thereby further improving brightness uniformity of the display panel at all positions.

It should be noted that the corner region is not limited to the vertex angle region of the polygon, and in a case that a planar shape of the reflective plate is a special shape, the corner region comprises a position of a protrusion at an edge of the special shape along any direction; and the special shape in the present disclosure means other shapes except polygons such as rectangle, triangle, pentagon and the like.

For example, the peripheral portion 31 is in a closed loop shape so as to reflect incident light in all directions. As illustrated in FIG. 1A, the shape of the peripheral portion 31 is a rectangular ring. Of course, in other embodiments, the shape of the peripheral portion 31 also can be other closed loop shapes such as annulus and the like.

For example, an area of the photoluminescent layer occupies 5% to 10% of an area of the peripheral portion of the reflection layer, that is, in FIG. 1A, the area of the photoluminescent layer 4 occupies 5% to 10% of the area of the peripheral portion 31 of the reflection layer 3. It not only can meet the requirement for improving the brightness of the display panel adopting the reflective plate at the corner region, but also cannot influence reflection of the peripheral portion 31 of the reflection layer 3 on light incident to the peripheral portion 31.

For example, a thickness of the photoluminescent layer 4 is in a range of 10 micrometers to 20 micrometers. In the embodiments of the present disclosure, the thickness of the photoluminescent layer 4 is in a range of 10 micrometers to 20 micrometers, and the photoluminescent layer 4 with such thickness can realize light emission at the corner region, and also can avoid influencing normal installation of the backlight module adopting the reflective plate in a case where the photoluminescent layer 4 is excessively thick. It should be noted that for example, the thickness of the photoluminescent layer refers to a thickness of the photoluminescent layer in a direction perpendicular to the substrate 1.

For example, the photoluminescent layer 4 particularly is made of a fluorescent powder material, a semiconductor light-emitting material, an organic light-emitting material or a quantum dot light-emitting material. Optionally, the photoluminescent layer 4 is made of the fluorescent powder material, and the fluorescent powder material is calcium halophosphate fluorescent powder. In the embodiments of the present disclosure, in a case that the photoluminescent layer is made of the calcium halophosphate fluorescent powder, the photoluminescent layer has a high light-emitting efficiency and stable performance, which is beneficial to long-time use of the reflective plate.

The calcium halophosphate fluorescent powder is also called as sun powder or sunlight powder. A reaction equation of preparation of the calcium halophosphate fluorescent powder is as follows:

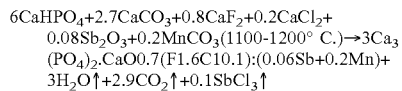

Light emission of the calcium halophosphate fluorescent powder is activated by activators antimony (Sb) and manganese (Mn) together. Activator atoms occupy positions of calcium atoms in a lattice. Third material has a sensitization phenomenon that after the activator Sb absorbs excitation energy, part of the excitation energy is discharged in a form of light radiation, and the other part of the excitation energy is transferred to the Mn in the process called as resonance transfer, so that the Mn generates own radiation. Therefore, total radiation is depended on characteristics of the two activators, changes with a change of a ratio of the two activators, and is also depended on ratios of fluorine and chlorine. For example, in a case where a content of the Mn is increased in calcium halophosphate which is activated by the Sb, radiation of orange yellow can be increased, and correspondingly, radiation of blue is reduced. By utilizing the above-mentioned phenomenon, calcium halophosphate fluorescent powder of different color temperatures can be obtained only by changing the content of the Mn.

For example, a material of the reflection layer 3 has relatively high reflectivity, and can perform specular reflection on light. For example, the material of the reflection layer 3 is titanium dioxide mixed transparent resin. Optionally, the transparent resin is polyethylene terephthalate or polycarbonate. In a particular manufacturing process, the reflection layer can be formed by fine foaming, a diameter of foam is about several micrometers, the finer the foam is and the higher a density of the foam is, the higher the reflectivity is, and each corner of the reflection layer is coated with the photoluminescent layer 4 in a region of a corresponding size of. For example, the material of the reflection layer 3 also can be a metal material with high reflectivity, for example, aluminum, copper, silver and the like. Of course, the material of the reflection layer 3 is not limited to the listed types above, as long as it can meet the requirement for excellently performing the specular reflection on the light.

Figure 2A:
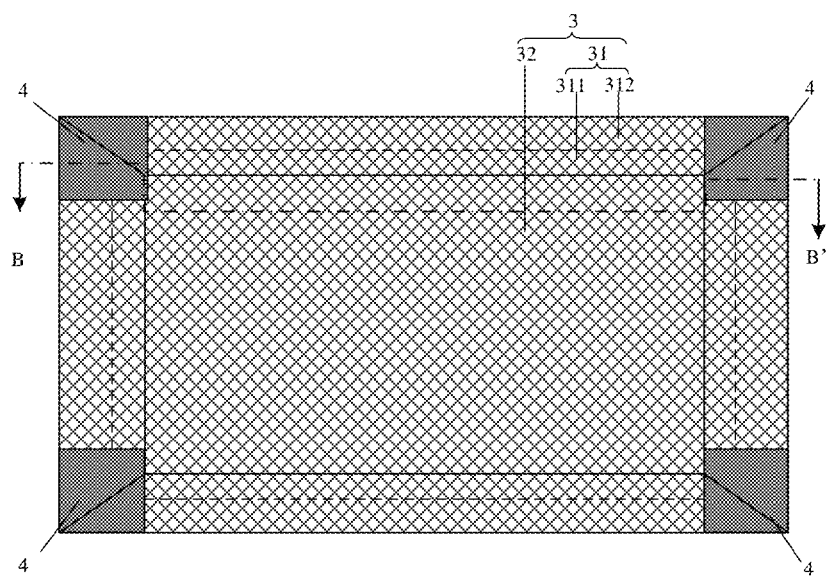
FIG. 2A is a plan schematic diagram of another reflective plate provided by one embodiment of the present disclosure.
Figure 2B:
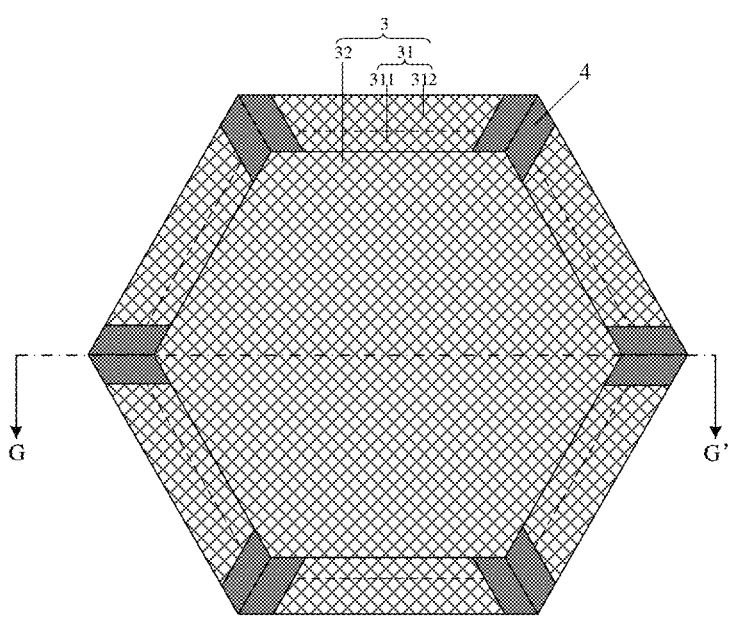
FIG. 2B is a plan schematic diagram of further another reflective plate provided by one embodiment of the present disclosure.
Figure 2C:
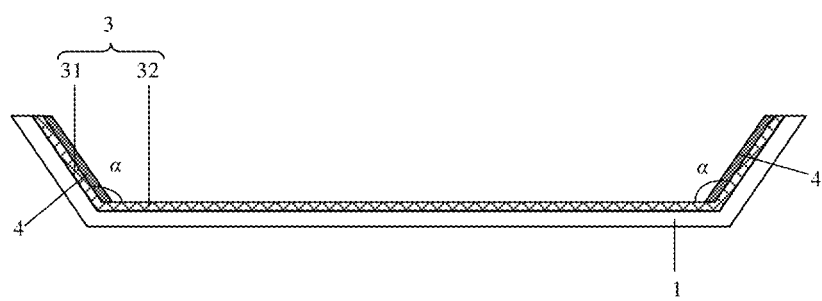
FIG. 2C is a sectional schematic diagram taken along a line B-B' in FIG. 2A or a line G-G' in FIG. 2B.

FIG. 2A is a plan schematic diagram of another reflective plate provided by one embodiment of the present disclosure, FIG. 2B is a plan schematic diagram of further another reflective plate provided by one embodiment of the present disclosure, and FIG. 2C is a sectional schematic diagram along a line B-B' in FIG. 2A or a line G-G' in FIG. 2B. As illustrated in FIG. 2A and FIG. 2C, the reflection layer 3 further comprises a central portion 32, and the peripheral portion 31 surrounds the central portion 32 and has an included angle α with the central portion 32. Therefore, the central portion 32 and the peripheral portion 31 perform multi-angle reflection on incident light at multiple positions, which is beneficial for the reflective plate to provide more uniform light. In a case that the reflection layer 3 further comprises the central portion 32, for example, the photoluminescent layer 4 covers at least part of the peripheral portion 31 of the reflection layer. For example, as illustrated in FIG. 2A, one part of the corner region covered by the photoluminescent layer 4 is in the edge portion 312 of the peripheral portion 31 of the reflection layer 3, and the other part is in the inner region 311 of the peripheral portion 31. For example, an orthographic projection of the edge, which is close to the middle region 32 of the reflection layer 3, of the photoluminescent layer 4 covers the corner region on a plane where the central portion 32 is positioned coincides with the edge of the central portion 32.

As illustrated in FIG. 2B and FIG. 2C, the reflection layer 3 further comprises a central portion 32. The peripheral portion 31 surrounds the central portion 32 and has an included angle α with the central portion 32. A case that a planar shape of the reflection layer 3 is a special shape is illustrated by taking a case that the planar shape of the reflection layer 3 is a hexagon as an example. The hexagon has six protruding vertex angle regions (regions covered by the photoluminescent layer 4). The photoluminescent layer 4 covers the six vertex angle regions, that is, the photoluminescent layer 4 covers each of the plurality of vertex angle regions. The embodiments of the present disclosure do not make any limitation to the specific shape of the reflection layer 3, which can be designed as required.

Other characteristics and effects of the reflective plates illustrated in FIG. 2A to FIG. 2C are the same with those in the previous embodiments, and can refer to the previous description.

Figure 3A:
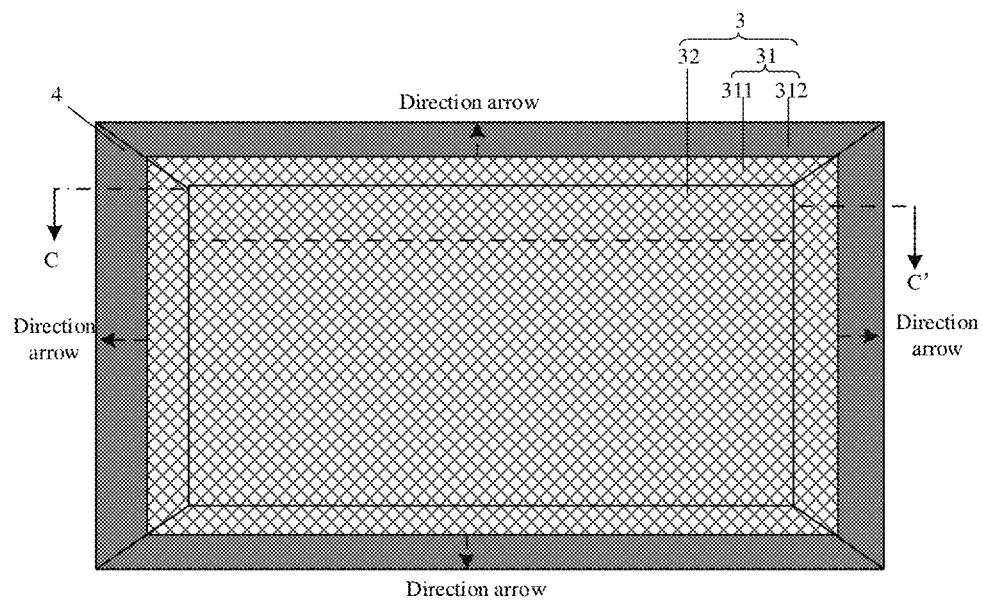
FIG. 3A is a plan schematic diagram of still another reflective plate provided by one embodiment of the present disclosure.
Figure 3B:
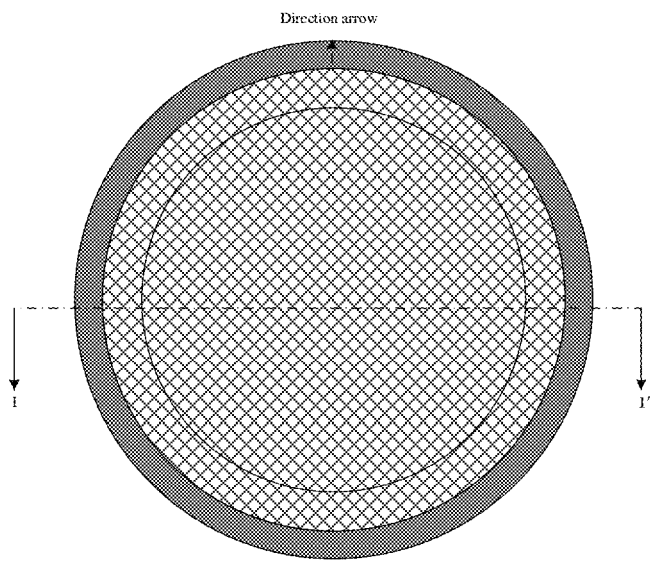
FIG. 3B is a plan schematic diagram of still another reflective plate provided by one embodiment of the present disclosure.
Figure 3C:
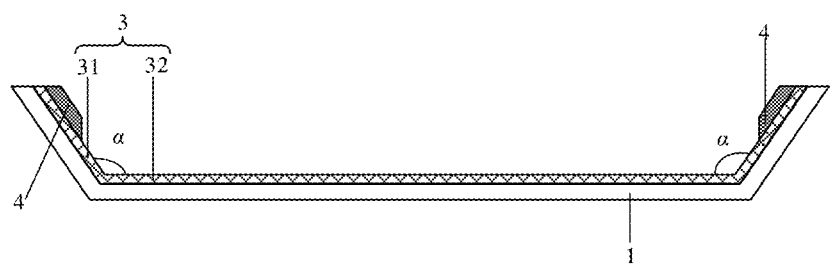
FIG. 3C is a sectional schematic diagram taken along a line C-C' in FIG. 3A or an I-I' line in FIG. 3B.

FIG. 3A is a plan schematic diagram of still another reflective plate provided by one embodiment of the present disclosure, and FIG. 3B is a plan schematic diagram of still another reflective plate provided by one embodiment of the present disclosure. As illustrated in FIG. 3A and FIG. 3C, the photoluminescent layer 4 covers an entirety of the edge region 312. For example, a planar shape of the photoluminescent layer 4 is a closed loop shape so as to adjust light at all positions of the edge region 312, and thus, the reflective plate can provide uniform light at the edge region.

For example, as illustrated in FIG. 3A, along a direction from the inner region 311 to the edge region 312, that is, the directions illustrated as direction arrows, light intensity of the photoluminescent layer 4 gradually increases.

The embodiment illustrated in FIG. 3B differs from the embodiment illustrated in FIG. 3A in that FIG. 3B shows a case where the planar shape of the reflection layer 3 is a special shape, such as a round shape. Other characteristics of the embodiment illustrated in FIG. 3B are the same with those in FIG. 3A.

Other characteristics and effects of the embodiments illustrated in FIGS. 3A to 3C are the same with description in the previous embodiments.

Figure 4A:
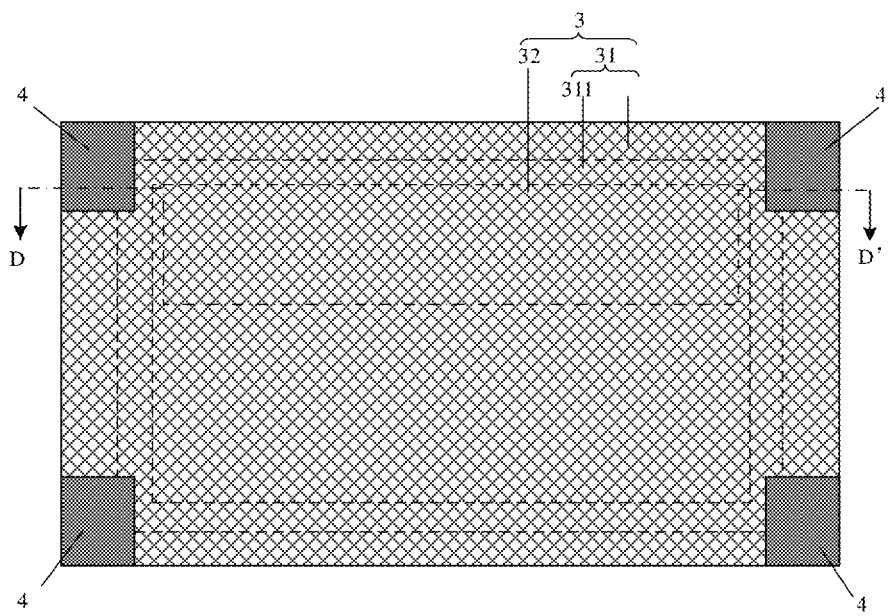
FIG. 4A is a plan schematic diagram of one more reflective plate provided by one embodiment of the present disclosure.
Figure 4B:
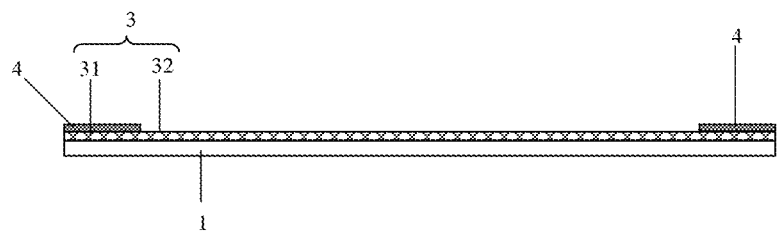
FIG. 4B is a sectional schematic diagram taken along a line D-D' in FIG. 4A.

FIG. 4A is a plan schematic diagram of still another reflective plate provided by one embodiment of the present disclosure, and FIG. 4B is a sectional schematic diagram along a line D-D' in FIG. 4A. The embodiments illustrated in FIG. 4A to FIG. 4B differ from that in FIG. 3A in that the peripheral portion 31 and the central portion 32 are positioned on the same plane, the reflective plate can achieve the same or similar technical effects with the reflective plates in the previous embodiments, has a simple structure and is beneficial to thinning of a backlight module adopting the reflective plate so as to benefit to thinning of a display panel adopting the backlight module. Other characteristics and effects of the embodiments as illustrated in FIG. 4A to FIG. 4B are the same with description in the previous embodiments.

At one embodiment of the present disclosure further provides a backlight module. The backlight module comprises: a backplane, any one of the reflective plates provided by the embodiments of the present disclosure, and a light source structure. The light source structure is on the backplane, the peripheral portion of the reflective plate surrounds the light source structure, and the reflection layer is configured to reflect at least part of light emitted by the light source structure.

Figure 5A:
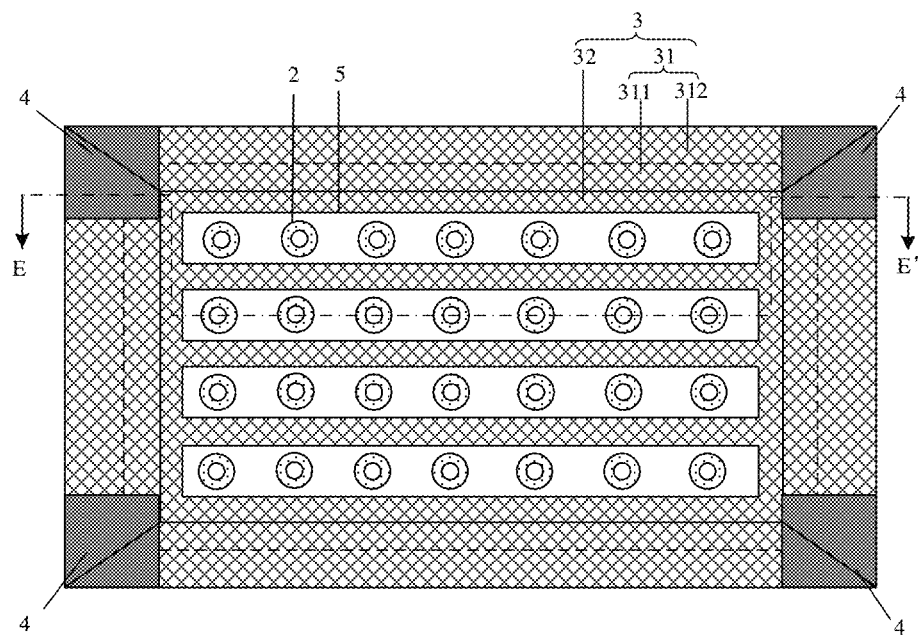
FIG. 5A is a plan schematic diagram of a direct-lit backlight module provided by an embodiment of the present disclosure.
Figure 5B:
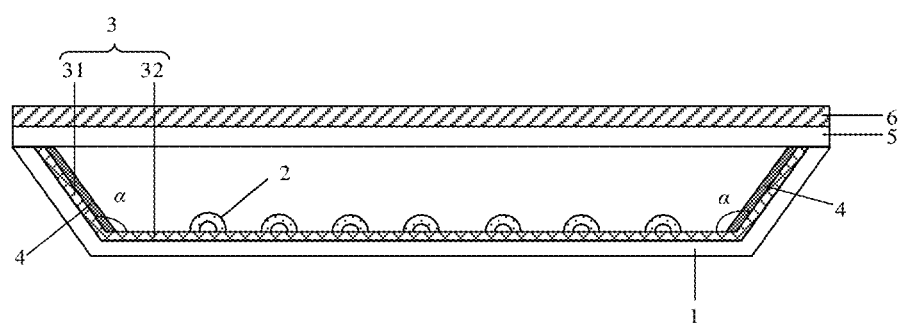
FIG. 5B is a sectional schematic diagram along a line E-E' in FIG. 5A.

FIG. 5A is a plan schematic diagram of a direct-lit backlight module provided by an embodiment of the present disclosure, and FIG. 5B is a sectional schematic diagram along a line E-E' in FIG. 5A. The embodiment is illustrated by taking a case that the direct-lit backlight module comprises the reflective plate as illustrated in FIG. 2A as an example. As illustrated in FIG. 5A and FIG. 5B, the direct-lit backlight module comprises any one of the reflective plates provided by the embodiments of the present disclosure, and a light source structure. The light source structure is on the reflective plate, and the peripheral portion 31 of the reflection layer 3 surrounds the light source structure; and the photoluminescent layer 4 is configured to receive at least part of light emitted by the light source structure, and the reflection layer 3 is configured to reflect at least part of the light emitted by the light source structure. When the backlight module works, at least part of the light emitted by the light source structure is incident to the photoluminescent layer 4, and the photoluminescent layer 4 emits light after absorbing light energy. At least part of the light emitted by the light source structure is incident to the central portion 32 and the inner region 311 of the peripheral portion of the reflection layer 3, and after the incident light is reflected by the reflection layer 3, light mixing is performed, so as to provide uniform light. With reference to description in the previous embodiments related to the reflective plate, the direct-lit backlight module provided by the embodiment of the present disclosure can improve brightness uniformity of the light provided by the backlight module and improve brightness of a display panel adopting the backlight module at the edge region (comprising a corner position) in the premise of not increasing the number of light sources and not increasing a light mixing distance, so as to avoid the problem of non-uniform brightness of the display panel caused by bad brightness of the display panel at the corner position.

For example, the light source structure comprises a plurality of light-emitting devices 2 distributed in an array, and each of the plurality of light-emitting devices 2 comprises a driving chip and a lens surrounding the driving chip. For example, the light source structure comprises a plurality of light bars 5, and a plurality of light-emitting devices 2 are arranged on each of the light bars 5. For example, the light-emitting devices 2 are a plurality of LED light-emitting devices, and each of the LED light-emitting devices comprises a LED chip and a lens surrounding the LED chip. For example, the light-emitting device 2 is a LED lamp bead, and the LED lamp bead comprises a LED chip and a lens coating the LED chip. For example, the optical lens is of a reflection type and has a light-emitting angle of a range of 120° to 150°.

For example, with reference to FIG. 5B, the direct-lit backlight module further comprises a diffusing plate 5 and an optical film 6. The diffusing plate 5 is positioned on the light source structure 2 and configured to diffuse the light from the light source structure and light reflected by the reflection layer 3. The optical film 6 is positioned on the diffusing plate 5, and for example, the optical film 6 is configured to make the light more uniform. For selection of the diffusing plate 5 and the optical film 6, those skilled in the art can refer to conventional technologies.

At least one embodiment of the present disclosure further provides a display apparatus. The display apparatus comprises the direct-lit backlight module provided by the embodiment of the present disclosure.

Figure 6:
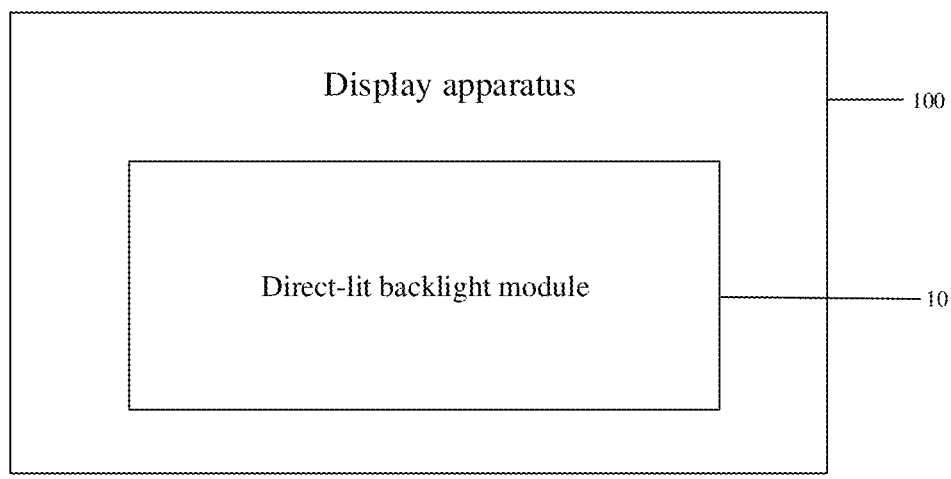
FIG. 6 is a schematic diagram of a display apparatus provided by one embodiment of the present disclosure.

Exemplarily, FIG. 6 is a schematic diagram of a display apparatus provided by one embodiment of the present disclosure. The display apparatus 100 comprises the direct-lit backlight module 10 provided by the embodiment of the present disclosure. For example, the display apparatus can be any display apparatus requiring a light source, such as a liquid crystal display apparatus and the like. For example, the display apparatus can be any product or part with a display function, such as a mobile phone, a tablet personal computer, a television, a display, a notebook computer, a digital photo frame, a navigator and the like.

At least one embodiment of the present disclosure further provides a manufacturing method of a reflective plate. The method comprises: providing a substrate; forming a reflection layer on the substrate, in which the reflection layer comprises a peripheral portion, and the peripheral portion comprises an inner region and an edge region on one side, which is close to an edge of the reflection layer, of the inner region; and forming a photoluminescent layer, in which the photoluminescent layer is on the reflection layer, covers at least part of the edge region and is configured to emit light under light irradiation.

For example, the reflection layer is formed on the substrate by methods of evaporation, deposition and the like, or the reflection layer is provided and the reflection layer is attached to the substrate. The particular method for forming the reflection layer is determined by a material of the reflection layer. For example, in a case of attaching the reflection layer to the substrate, before the reflection layer is attached to the substrate, firstly, the photoluminescent layer is formed on the reflection layer by a method of spraying, so that in a case that the peripheral portion and the central portion have the comprised angle (as illustrated in FIG. 2C), the process difficulty can be reduced and it is convenient for production.

For example, in the manufacturing method of the reflective plate, a planar shape of the reflection layer has at least one corner region, and at least part of the corner region is in the edge region; and the manufacturing method of the reflective plate comprises: forming the photoluminescent layer covering the at least one corner region or forming the photoluminescent layer covering an entirety of the edge region. The specific characteristics and effects of the reflective plate formed by the manufacturing method of the reflective plate, as provided by the embodiment of the present disclosure, can refer to description in the previous embodiments.

For example, the photoluminescent layer is formed by a method of spraying. For example, the manufacturing method of the reflective plate comprises: providing different concentrations of photoluminescent material solutions; and along the direction from the inner region 311 to the edge region 312 (with reference to FIG. 3A), the concentrations of the sprayed photoluminescent material solutions gradually increase, so that light intensity of the formed photoluminescent layer gradually increases along the direction from the inner region 311 to the edge region 312.

The above description is merely an exemplary embodiment of the present disclosure and is not intended to limit the scope of protection of the present disclosure, the protection scope of the present disclosure is determined according to the scope defined in the claims. Obviously, those skilled in the art can make various changes and modifications to the present invention without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A reflective plate, comprising:
    a reflection layer, comprising a peripheral portion, wherein the peripheral portion comprises an inner region and an edge region outside the inner region; and
    a photoluminescent layer on the reflection layer, the photoluminescent covering at least part of the edge region and being configured to emit light under light irradiation, wherein
    a planar shape of the reflection layer has at least one corner region, at least part of the at least one corner region is in the edge region, and the photoluminescent layer covers the at least one corner region and does not cover positions of the edge region other than the at least one corner region.

2. The reflective plate according to claim 1, wherein the reflection layer further comprises a central portion; and
    the peripheral portion surrounds the central portion and has an included angle with the central portion.

3. The reflective plate according to claim 1, wherein the reflection layer further comprises a central portion; and
    the peripheral portion surrounds the central portion and is in a same plane with the central portion.

4. The reflective plate according to claim 1, wherein an orthographic projection of the reflection layer on a plane parallel to the central portion is in a shape of a polygon, the at least one corner region comprises a plurality of vertex angle regions of the polygon, and the photoluminescent layer covers at least one of the plurality of vertex angle regions.

5. The reflective plate according to claim 4, wherein the photoluminescent layer covers each of the plurality of vertex angle regions.

6. The reflective plate according to claim 1, wherein the photoluminescent layer covers an entirety of the edge region.

7. The reflective plate according to claim 6, wherein light intensity of the light emitted by the photoluminescent layer gradually increases along a direction from the inner region to the edge region.

8. The reflective plate according to claim 1, wherein the peripheral portion is in a closed loop shape.

9. The reflective plate according to claim 1, wherein an area of the photoluminescent layer occupies 5% to 10% of an area of the peripheral portion of the reflection layer.

10. The reflective plate according to claim 1, wherein a thickness of the photoluminescent layer is in a range of 10 micrometers to 20 micrometers.

11. The reflective plate according to claim 1, wherein a material of the photoluminescent layer is a fluorescent powder material, a semiconductor light-emitting material, an organic light-emitting material or a quantum dot light-emitting material.

12. The reflective plate according to claim 11, wherein the material of the photoluminescent layer is the fluorescent powder material, and the fluorescent powder material is calcium halophosphate fluorescent powder.

13. A direct-lit backlight module, comprising:
    the reflective plate according to claim 1; and
    a light source structure on the reflective plate, wherein the peripheral portion of the reflection layer surrounds the light source structure; and the photoluminescent layer is configured to receive at least part of light emitted by the light source structure, and the reflection layer is configured to reflect at least part of the light emitted by the light source structure.

14. The direct-lit backlight module according to claim 13, wherein the light source structure comprises a plurality of light-emitting devices arranged in an array, and each of the plurality of light-emitting devices comprises a driving chip and a lens surrounding the driving chip.

15. The direct-lit backlight module according to claim 13, further comprising:
    a diffusing plate on the light source structure, the diffusing plate being configured to diffuse light which is emitted from the light source structure and then reflected by the reflection layer; and
    an optical film on the diffusing plate.

16. A display apparatus, comprising the direct-lit backlight module according to claim 13.

17. A manufacturing method of a reflective plate, comprising:
    providing a substrate;
    forming a reflection layer on the substrate, wherein the reflection layer comprises a peripheral portion, the peripheral portion comprises an inner region and an edge region, and the edge region is on one side of the inner region closing to an edge of the reflection layer; and
    forming a photoluminescent layer on the reflection layer, wherein the photoluminescent layer covers at least part of the edge region and is configured to emit light under light irradiation;

a planar shape of the reflection layer has at least one corner region, and at least part of the at least one corner region is in the edge region;

the manufacturing method of the reflective plate comprises:

forming the photoluminescent layer which covers the at least one corner region and does not cover positions of het edge region other than the at least one corner region.

18. The manufacturing method according to claim 17, wherein the photoluminescent layer covers an entirety of the edge region.

* * * * *